Nov. 24, 1931.  W. S. HOWARD  1,833,872
SELF LOADING VEHICLE
Filed April 5, 1928  5 Sheets-Sheet 1

INVENTOR.
William S. Howard
BY Emery Booth Janney & Varney
ATTORNEYS.

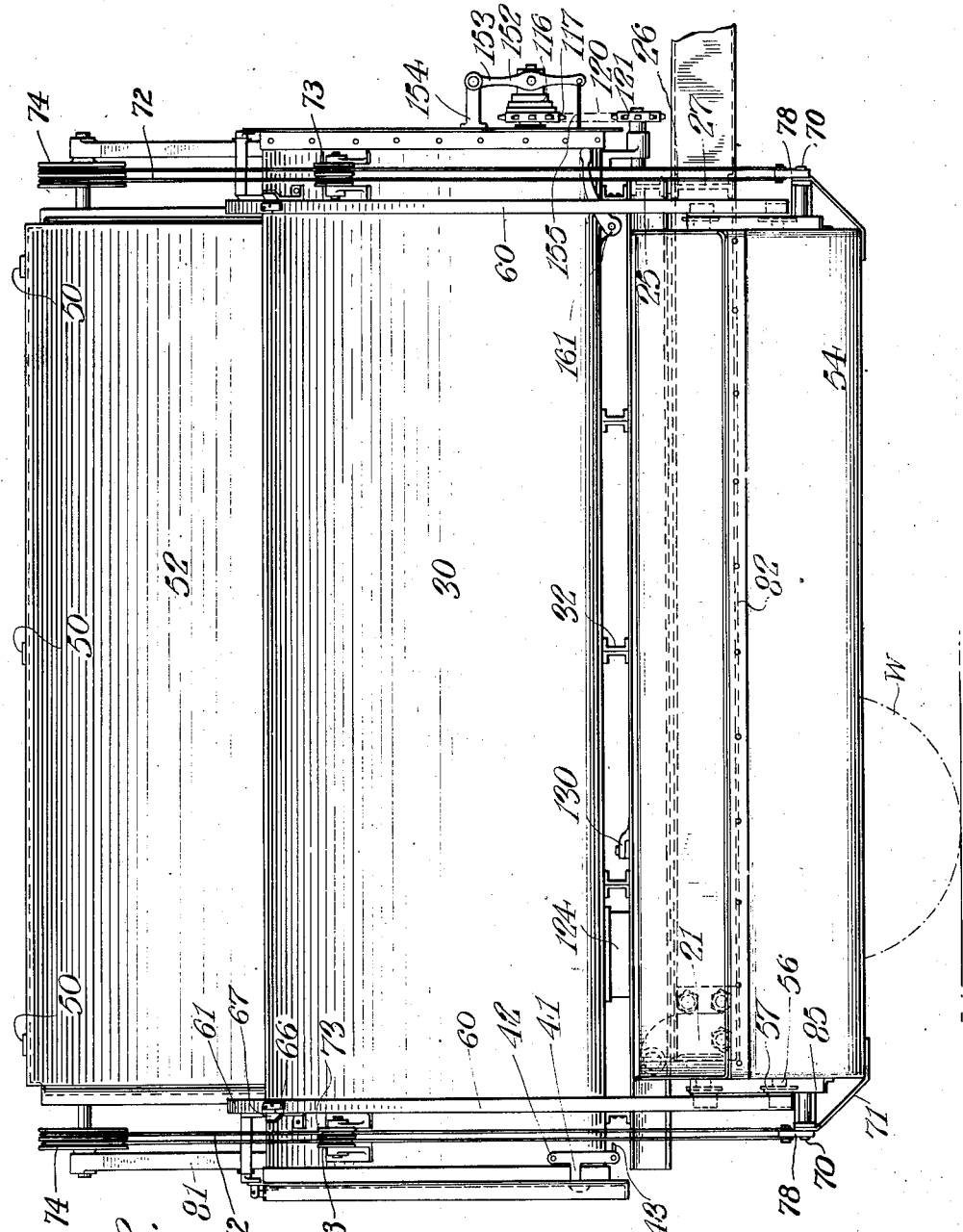

Nov. 24, 1931.  W. S. HOWARD  1,833,872
SELF LOADING VEHICLE
Filed April 5, 1928  5 Sheets-Sheet 3
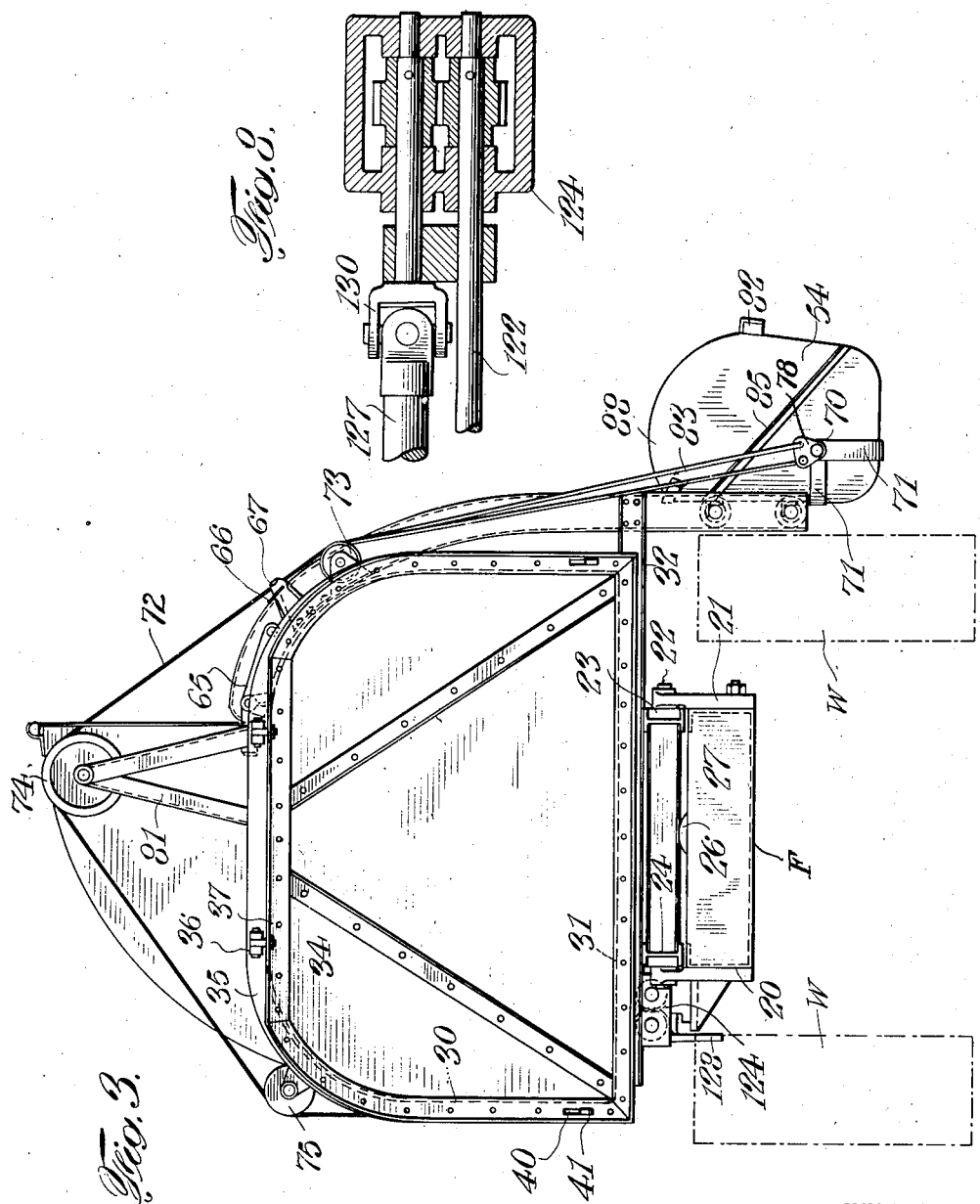
INVENTOR.
William S. Howard
BY Emery, Booth, Janney & Varney
ATTORNEYS.

Nov. 24, 1931.  W. S. HOWARD  1,833,872
SELF LOADING VEHICLE
Filed April 5, 1928  5 Sheets-Sheet 4
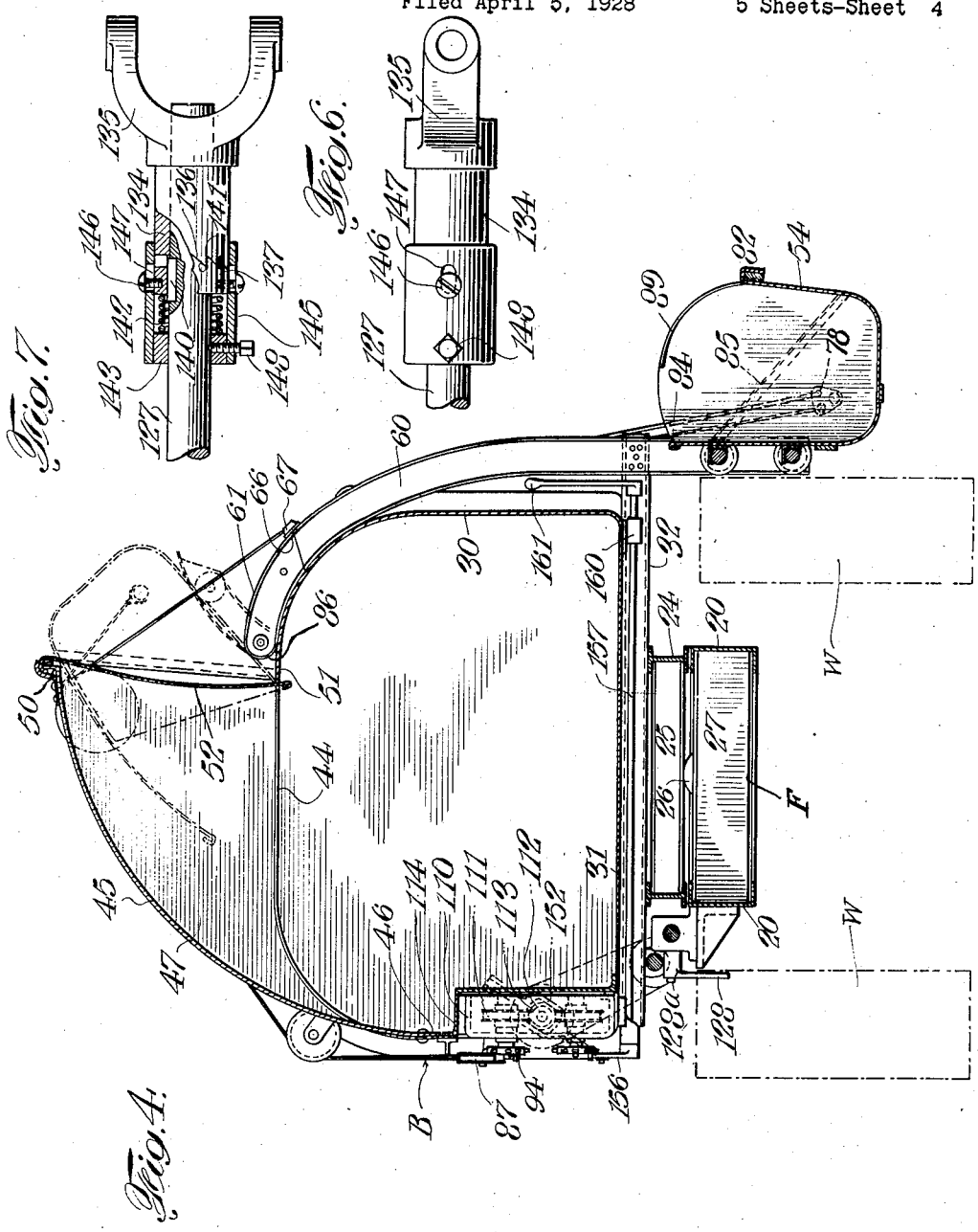
INVENTOR.
William S. Howard
BY Emery Booth Janney & Varney
ATTORNEYS.

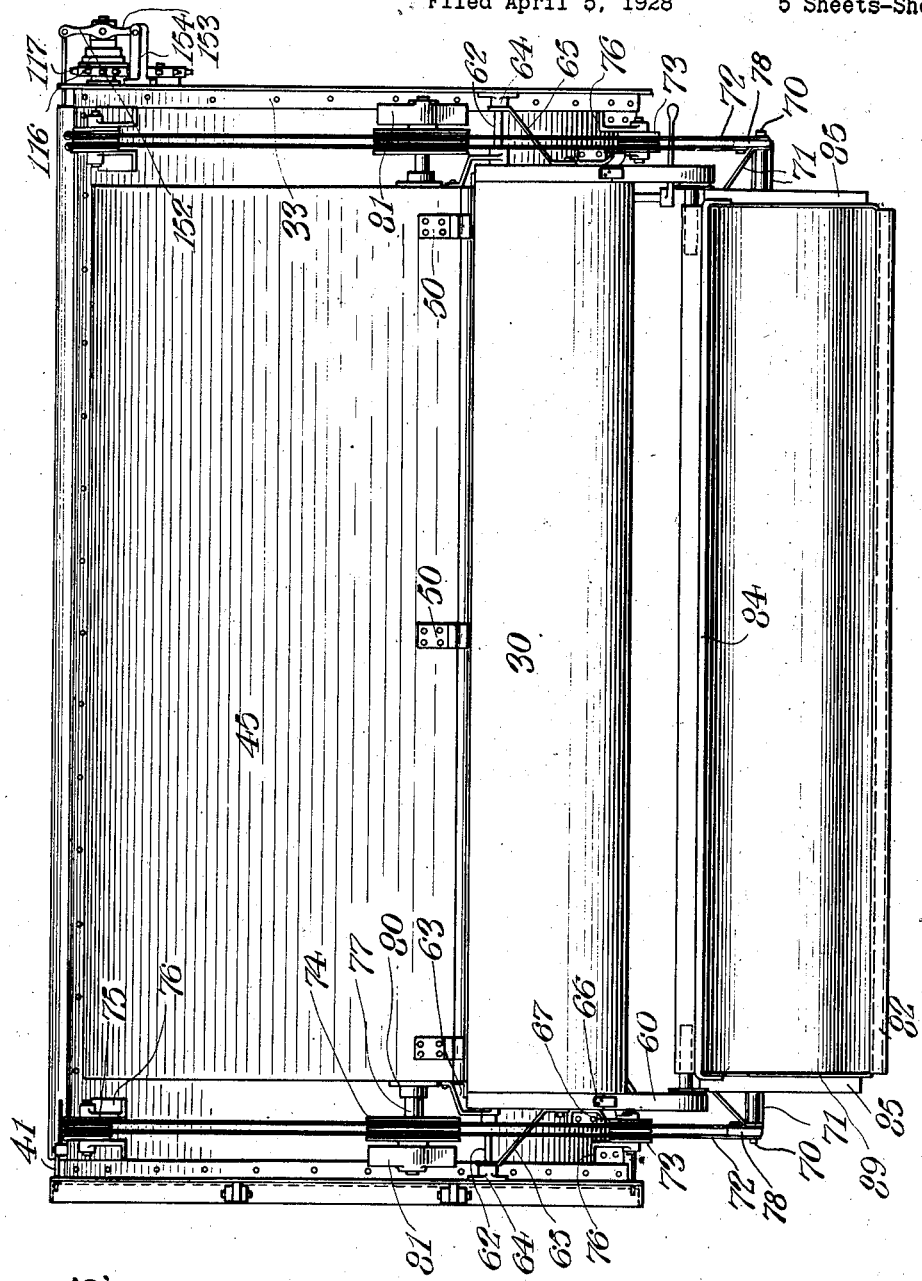

Patented Nov. 24, 1931

1,833,872

UNITED STATES PATENT OFFICE

WILLIAM S. HOWARD, OF NEW YORK, N. Y., ASSIGNOR TO COLLECTION EQUIPMENT CORPORATION, OF NEW YORK, N. Y., A CORPORATION OF DELAWARE

SELF-LOADING VEHICLE

Application filed April 5, 1928. Serial No. 267,702.

The present invention relates to self-loading, self-dumping vehicles, more particularly to hoisting apparatus adapted to raise and lower a part relative to the body of the vehicle. Among the various objects of the invention are: The provision of means capable of raising and lowering a movable part while keeping the part under the constant control of the power-drive device or holding the part securely in any traversed position although the part may be disconnected from the power-drive device; the provision of hoisting apparatus on such a vehicle capable of both raising and lowering the part while the power-drive device moves consistently in one direction, thus dispensing with the usual power reverse devices, frictional slip or fluid-leak let-off devices or other like devices adapted to secure the return of the raised part to its lower position; the provision of an improved driving connection between active parts on the chassis and on the dump body respectively of the vehicle; the provision of improved means for controlling the movements of a hoist bucket employed for loading material into the body of the vehicle; the provision of means adapted to avoid breakage in case the part being elevated should meet with undue resistance to its movement; and the provision of improved devices for controlling the movements of the parts being elevated.

Other objects and certain novel features will be apparent from the following description and accompanying drawings of one illustrative embodiment of the invention. In the drawings:

Fig. 2 is a right side elevation;

Fig. 3 is a rear elevation;

Fig. 4 is a transverse vertical section taken on the line 4—4 of Fig. 1;

Fig. 5 is a top plan view;

Fig. 6 is an enlarged elevation of a detail;

Fig. 7 is a longitudinal sectional view partly in elevation, of the detail shown in Fig. 6; and Fig. 8 is a horizontal sectional view of a gear frame shown in the left lower portion of Fig. 3.

Figure 1:
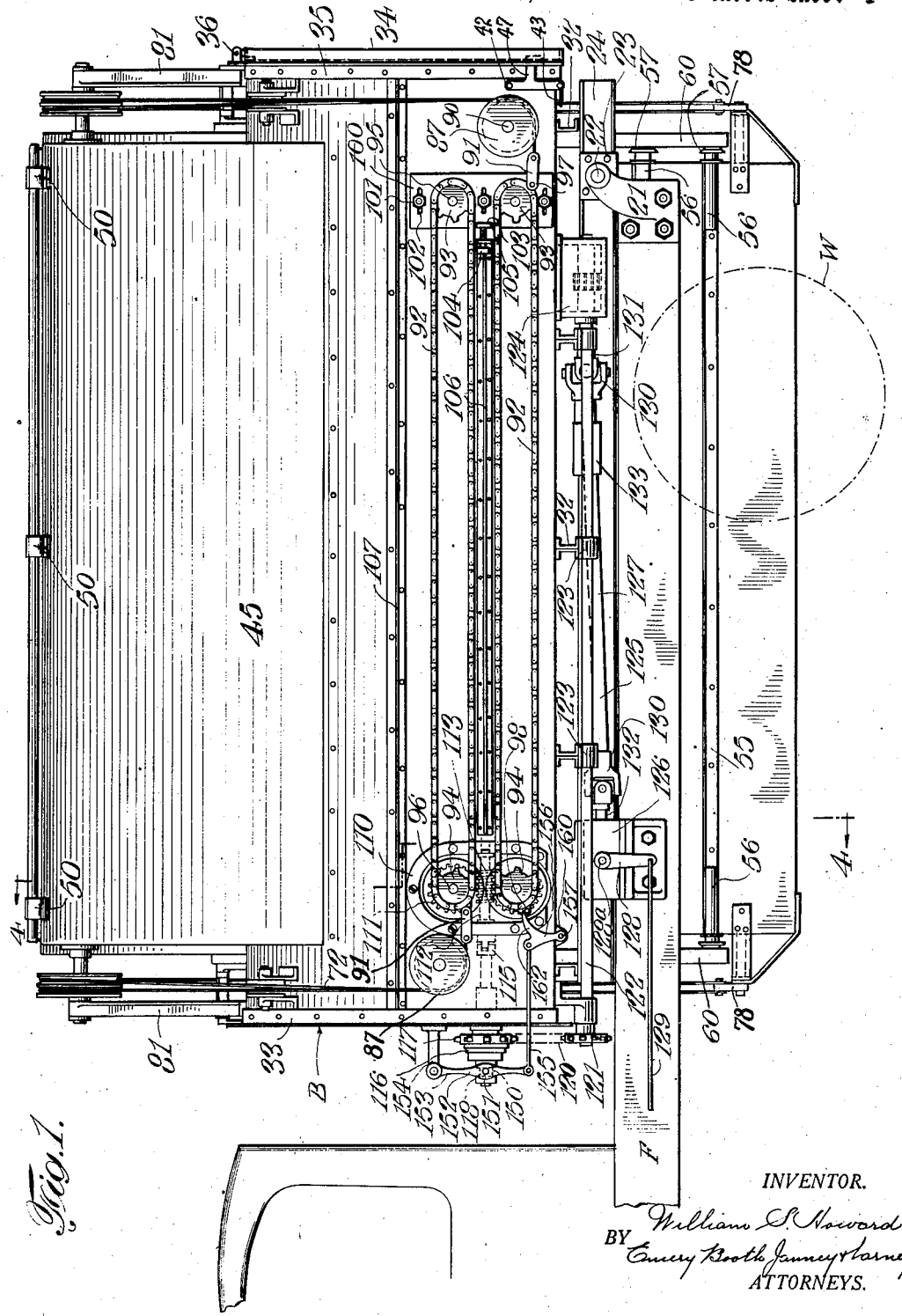
Fig. 1 is a left side elevation of a self-loading, self-dumping vehicle embodying the present invention.

The vehicle with which the present invention is illustrated may be any usual type of motor truck. As shown in Fig. 1 the vehicle comprises the chassis frame F mounted upon supporting wheels W through spring and other usual members (not shown). The frame F, referring to Figs. 1 and 3, includes spaced longitudinal side sills 20 provided at their rear ends with hinge plates 21 furnishing bearings for trunnions 22 carried by other hinge plates 23 secured to spaced longitudinal beams 24 preferably of I-section supporting the rear end of a dump body generally indicated by the letter B.

The body beams may rest directly upon the chassis sills but preferably, as shown, they are spaced slightly above the sills and are joined at their front ends by a transverse body beam 25 supported through a pedestal 26 upon a transverse chassis sill 27 secured at its ends to the longitudinal chassis sills. This method of construction provides suspension for the body at three points—represented by the two trunnions and the pedestal— and thus materially minimizes warping of the body which would otherwise occur to a great extent even though the body be constructed of relatively heavy plate and be fully reenforced as shown.

Referring to Figs. 1, 3 and 4, the body B comprises a lower oval shaped box 30, the floor 31 of which rests upon and is secured to the transverse joists 32 which, in turn, are secured to the longitudinal body beams 24, the box, joists and beams forming a rigid unit. The front end of the body box is closed by a plate and reenforced by an angle iron girdle 33 while the rear end is normally closed by a swinging door 34 which is hinged at the top of a strengthening angle iron body girdle 35 through hinges 36 secured to the girdle and to an angle iron frame 37 of the door.

Referring to Fig. 3 it will be seen that the angle iron frame 37 of the door coincides and fits flange to flange with the girdle 35 of the box except at the top of the door where the door frame is dropped to accommodate the hinges. At the lower sides of the body the lateral facing flanges of the door and girdle are provided with registering rectangular slots 40 for the accommodation of latches 41 of any usual form. The latch is T-shaped as shown in Fig. 1 and is pivoted at the upper end of the T-head to the box by a pin 42. Its lower end is attached to an operating rod 43 which may extend forward to any convenient point of control.

As shown in Fig. 4 the top of the body is provided with an aperture 44 of considerable width and length and this aperture is covered by a bonnet comprising a curved roof plate 45 attached at its lower longitudinal edge 46 to the inside of the box and closed at its ends by vertical plates 47 attached to the top of the box. The upper edge 50 of the bonnet roof is spaced considerably above the top of the box to provide an aperture in the front of the bonnet. A curved flap 52 is hinged along its upper edge to the upper edge 50 of the bonnet and normally rests at its lower edge, due to the action of gravity, against the edge 51 of the box aperture. The flap nevertheless may be readily pushed inward and upward about its hinge as indicated in dotted lines in Fig. 4 so that material may be dumped into the body through the vertical opening of the bonnet normally closed by the flap.

Referring to Figs. 1 and 2 the bonnet is found to extend throughout the greater portion of the length of the body box but is stepped back at either end to permit certain parts later to be described to be mounted upon the box.

The means employed for elevating and dumping material into the body may be of any approved character but preferably comprises a bucket 54 substantially corresponding in length to the length of the bonnet. The bucket may be of sheet metal and is reenforced along its inner side (Fig. 1) by longitudinal ribs of angle bars 55 to the ends of which axles 56 are attached as by welding. There are two axles protruding beyond each end of the bucket and these axles support flanged rollers 57 adapted to travel within the facing grooves of channel-shaped track rails 60 secured to the body. These rails, as seen in Fig. 4, are more or less vertical and are spaced to stand clear of the vehicle wheels at their lower ends but curve over and lie directly upon the body at their upper ends. At their lower ends the track rails may be attached to the extended ends of certain of the transverse floor joists 32 and at their upper ends may be riveted or bolted to the sides of the body.

Beyond the upper end of the track a hinged track section 61 forms a continuation of each of the lower rails. Each hinged section (Fig. 5) is provided with a longitudinally extending shaft 62 mounted in bearing brackets 63, 64 riveted or otherwise fixed adjacent the top of the body box. If desired, a brace 65 may extend from the lower end of the track section to the outer end of its shaft 62 to prevent lateral displacement of the lower end of the section relative to the lower track rail. A strap 66 is attached to the upper side of the hinged track section at the lower end so that, when the section is dropped to its lower position, it will be placed in accurate registry with the lower rail. Proper lateral positioning of the section is further secured by upstanding curved plates 67 fixed to the box adjacent the lower ends of the sections.

As clearly shown in Figs. 3 and 5 the bucket 54 is provided at either end with a protruding bar 70 secured to the wall of the bucket at its inner end and braced by straps 71 extending from its outer end to points of attachment with the sides of the bucket. To each of these bars the strands of a twin hoisting cable 72 are secured by an equalizer 78. These cables are trained over the body by grooved pulleys 73, 74, 75 secured upon the body beyond the ends of the bonnet and extend to draft mechanism mounted on the left side of the body. The pulleys 73, 75 at the sides of the body may be mounted upon bearing brackets 76 while the pulleys 74 at the top of the body are mounted loosely upon short shafts 77. At their inner ends the shafts 77 are secured by flanged plates 80 attached to the bonnet ends and at their outer ends by inverted V-standards 81 attached to the top of the body box.

The top of the bucket is inclined outwardly to provide for easier filling and may be reenforced on its outer edge by a wooden rail 82 which can be replaced when worn. The inner top corners may be reenforced by angle straps 83 and the longitudinal edge may be turned as shown at 84 to prevent splitting of the same and for further strengthening. The ends of the bucket are provided with angle-bar strips 85 adapted to come to rest against the end edges of the bonnet opening to prevent the bucket falling inward when raised to dumping position indicated in dotted lines at the top of Fig. 4. The end walls of the bucket are extended upwardly to form curved plates 88 having a reenforced upper edge 89 for at least a portion of their margin to operate the flap 52.

The manner of dumping the bucket may be noted in Fig. 4. As there shown when the bucket approaches the end of its upward travel its wheels enter the hinged track sections and stop against the end flanges 96 of the same. Further movement of the hoisting cable causes the bucket to lift and to carry with it the track sections through engagement of the wheels with the flanges of the track sections. This arrangement assists in the lowering of the bucket by gravity since the weight of the track section is added to the weight of the bucket and the bucket will thus be positively returned even though the truck may be located upon a surface which is considerably inclined toward the left side as viewed in Fig. 4.

As best shown in Fig. 1 the cables at the side of the body opposite that on which the bucket is mounted pass over sheaves 87 rotatably mounted upon stub shafts 90 attached to the side of the body and are secured through links 91 to endless flexible members in the form of chains 92 passing over spaced sprockets 93, 94 mounted on shafts 95, 96 mounted on the side of the body. The links 91 are pivoted at their inner ends to the chains upon studs 97 extending beyond the outside plane of the chains and sprockets. The links carrying the cables may thus make a continuous pass with the chains from end to end without coming in contact with or being hindered in their movement by the sprockets over which the chains pass.

The shafts 95 for the idler sprockets 93 at one end are mounted upon a plate 100 attached to the body by bolts 101 passing through slots 102 of the plate. This construction provides for taking up slack of the chains. The means herein provided for this take-up comprises a flat arm 103 extending outwardly between the inner spans of the chains from the plate 100, which plate is adjusted by a set screw 104 passing through a threaded hole in an arm 105 forming part of a reenforcing rib 106 extending longitudinally along the side of the body between the chains. The reenforcing rib extends to the mounting for the drive sprockets 94 so as to take up any thrust between the two sprocket mountings and prevent, to a large extent, any buckling of the sides of the body box on account of the pull on the chains. In addition to this reenforcing rib another longitudinal reenforcing rib 107 is secured to the side of the body above the chain mounting.

The drive sprockets 94 for the chains may be driven in any approved manner. As shown especially on the left side of Figs. 1 and 4 these sprockets 94 are mounted upon shafts 96 extending into a gear casing 110. Within the gear casing the shafts have worm gears 111 rigidly secured thereto. Between and meshing with the worm gears 111 a shaft 112 having fixed thereon a worm pinion 113 is mounted.

The gear casing is mounted near the front end of the body box and, as indicated at 114 in Fig. 4, it is set into a recess in the side of the box, the side plates of the same being carried over the gear casing to prevent damage by material being dumped into the body and falling thereupon. The worm shaft extends out of the gear box through a bearing mounted on the front end plate of the body box and between its ends may be provided with an extensible coupling 115 to furnish endwise movement to that portion of the shaft within the gear casing. The outer end of the shaft immediately beyond the front end of the body box is provided with a plate clutch 116, the outer housing of which is equipped with a sprocket wheel 117. A chain 120 passes over this sprocket wheel and over another aligned sprocket wheel 121 fast upon a shaft 122 supported in bearings 123 secured beneath the body joists 32. This shaft extends toward the rear of the body, adjacent the trunnions 22 upon which the body is hingedly supported, into a gear frame 124 mounted upon the bottom of the body box, preferably outside the body beam 24.

A second shaft 125 substantially parallel to the shaft 122 extends out of the same side of the gear frame 124 to the gear box 126 of power take-off mechanism driven in any conventional manner from the engine shaft of the truck. The latter shaft is provided between its ends with a flexible connection comprising a floating shaft 127 attached by universal couplings 130 to the ends of stub shafts 131, 132 and provided at some point along its length with a clutch 133 for disconnecting the shaft when the body is lifted above a predetermined angular position. The clutch 133, it is to be understood, is employed to prevent excessive strain on the universal coupling when the body is tilted to the extreme angle and if the universal coupling is of such a nature that it will not be likely to suffer injury by extreme tilting of the body then the clutch 133 may be dispensed with.

This clutch is shown particularly in Figs. 1, 6 and 7 where it is seen that the floating shaft 127 extends loosely within the hub 134 of the yoke 135 of the universal coupling, the hub having teeth 136 at its outer end. A mating sleeve 137 splined to the shaft 127 by a feather 140 is provided with teeth 141 adapted to engage the teeth 136 of the yoke hub. The sleeve is urged toward the hub by a spring 142 whose outer end engages a collar 143 rigidly attached to the shaft and to an encasing cuff 145 by set screws 148. The cuff encloses the collar, sleeve, spring, teeth and part of the hub. The sleeve 137 is secured to the encasing cuff 145 by screws 146 passing through slots 147 in the cuff. By this construction a slight movement between the shaft and the yoke hub is allowed before the parts separate but the movement is limited by the length of the slots 147 so that when the body is raised the teeth of one part will be disengaged from the teeth of the other part and the driving connection thus severed.

As is clear from the preceding description, the bucket 54 may be elevated and lowered when the body is in its lower position and the clutch on shaft 125 is engaged. The power take-off mechanism may be connected with the shaft 125 by operation of an arm 128 fast on a shaft 128a passing into the gear box 126 and controlled by a rod 129 extending toward the front of the vehicle. Normally the connection in the gear box is established while the truck is stopped for loading and may even be maintained when the truck is making short moves. The operation of the shaft 125 will cause operation of the geared longitudinal shaft 122 turning sprocket wheel 121 and, through chain 120, the outer casing of the clutch 116. This clutch—assumed here to be engaged—will drive through the worm pinion 113 and gears 111, the shafts 96 on which the chain sprockets 94 are mounted and cause the endless chains 92 to be moved continuously but in opposite directions carrying with them the links 91 and the cables 72 attached to the opposite ends of the bucket. The link-attached end of one of the cables moves to the right (Fig. 1) in raising the bucket while the other moves toward the left. The forces acting through the chains upon the supporting body plates will thus be more or less balanced in each direction insuring easy movement of parts.

When the bucket approaches its upper position as shown in Fig. 4 the curved end plates 88 of the bucket strike the flap 52 below its hinged connection with the top edge of the bonnet and force it inwardly. Toward the end of the swing of the flap it is engaged by the wooden rail 82 attached to the outside edge of the bucket. The bucket then dumps its contents during the interval that it is maintained in its upper position. This interval is permitted because at that time the links 91 to which the draft ends of the cables are attached are passing over the outer ends of the sprockets. When the links have passed the sprockets and started to return along the other span of the chains, the pull upon the cables tending to move the bucket upward is relieved and the bucket is free to return by gravity to its lower position, it being noted, as already explained, that the weight of the hinged track sections assists the return of the bucket from dumping position to its operative position relative to the track. The bucket is then capable under its own weight of returning down the track to its original loading position as shown in Fig. 4.

In the above summary it has been assumed that the clutch 116 was engaged to move the bucket positively but it is desirable in order to prevent breakage that the strength of pull on the hoist cables be limited to a predetermined value. To this end the clutch 116 selected is of such a nature and may be so adjusted that its plates will slip over each other in case the bucket meets with undue resistance to its movement.

While the mechanism already described is sufficient for the operation of the bucket and gives the driver in the cab a general supervision, it is advantageous to provide other controls giving more immediate supervision of the movement of the bucket to those stationed for work there. For example it may be found desirable by those loading the bucket that it be stopped in its upper position and remain there until an operator intentionally procures its downward movement. To this end it is arranged that the clutch 116 be provided with operating devices which may either be controlled directly by hand or automatically by movement of parts.

As shown to the left of Fig. 1, the movable part controlling engagement of the clutch plates is provided with an annular groove 118 in which a ring 150 is mounted, the ring being provided with diametrical pins 151 having bearings in the spaced straps 152 of an operating arm 153. This arm 153 is pivoted above the clutch at its upper end to a bracket 154 secured to the front end plate of the body and at its lower end is pivoted to and adapted to be operated by a rod 155, the rod in turn being pivoted to an arm 156 fast upon a slidable shaft 157 mounted in brackets 160 beneath the body of the truck.

The other end of the shaft has secured thereto a manual operating handle 161 (shown at the right of Figs. 2 and 4) through which the shaft may be rotated and also slid axially across the body of the truck. A finger 162 is formed integral with the arm 156. This finger may be located adjacent the side and end of one of the endless chains of the hoisting mechanism or, by sliding movement of the shaft, it may be moved further away from the chain. When located adjacent the plane of the chain the finger is adapted to be operatively engaged by one or the other of cam studs 97, 98 on the chain, one of which, 97, secures the link 91 to the chain as previously described. Thus the finger and its shaft 157 will be operated when the studs pass over the sprocket wheel adjacent the finger in case the handle be pulled out. As shown in Fig. 1 the finger is just being operated by the stud 98.

The position of the studs may be arranged as desired with relation to the length of the chain or additional pins may be employed so that the bucket may be brought to rest by automatic disengagement of the clutch in any desired position but, as shown, the studs are arranged for stoppage of the bucket only at its upper and its lower positions.

The clutch will be kept disengaged and the bucket will be held in any position to which it is moved because of the one-way drive arrangement between the worm pinion and the worm gears which it operates. The operator may start the bucket into movement by pushing in and swinging the operating handle, thus rotating the shaft to cause engagement of the clutch. Then, if he wishes the bucket to stop automatically, he pulls the lever back to place finger 162 in position to be operated by movement of the endless chain. Otherwise, he may simply swing the handle himself to disengage the clutch when he wishes to stop the bucket.

The operation of the various parts will be clear from the foregoing description so a detailed summary of operations is deemed unnecessary.

While one embodiment of the invention has been illustrated and described in detail it will be obvious that various changes and modifications may be made within the spirit of the invention and the subjoined claims.

What I claim is:

1. Power take-off mechanism for the operation of devices located on a body member which is tiltably mounted upon a frame member provided with a power driving device, comprising in combination, a power shaft mounted at least in part on said frame, a power shaft mounted at least in part on said body approximately parallel with the first mentioned shaft, both of said shafts being disposed at substantially right angles to the pivot line between the body and frame, a gear box rigidly mounted on one of said members, a stub shaft mounted in said gear box and connected by a floating shaft and universal joints to one of said power shafts, and intermeshing gears mounted on said stub shaft and the other of said power shafts, said gears being disposed forward of the pivot line of the body and frame.

2. Power take-off mechanism for the operation of devices located on a body member which is tiltably mounted on a frame member provided with a power driving device, comprising in combination, a pair of parallel power shafts each mounted at least in part on said body and frame respectively, meshing gears mounted on said shafts and disposed adjacent the pivot line of said body and frame, and a flexible slidable connection including a floating shaft section in one of said shafts to maintain proper relationship of the shafts in all positions of the body.

3. Power take-off mechanism for the operation of devices on the dump body of a vehicle comprising a pair of parallel shafts, one mounted at least in part on the body and one mounted at least in part on the frame, meshing gears on said shafts, and means associated with one of said shafts including axially slidable and flexible connections for maintaining proper relationship between the shafts in all positions of the body.

4. Power take-off mechanism for the operation of devices on the tiltable dump body of a vehicle, comprising a pair of shafts which are substantially parallel when the body is in its lower position, one of which is at least in part on the tiltable body and one of which is mounted at least in part on the frame, and a par-axial connection for said shafts maintained in all positions of said body, said connection being located adjacent but at one side of the pivot line of the body upon the frame.

5. Power take-off mechanism for the operation of devices on the tiltable body of a vehicle, comprising a pair of shafts which are substantially parallel when the body is in its lower position, one of said shafts being mounted at least in part on the tiltable body and the other being mounted at least in part on the chassis frame of the vehicle, a par-axial connection for said shafts located adjacent the pivot line of the body upon the frame, and a universal joint in one of said shafts permitting tilting of the body while maintaining the driving connection.

6. A self-loading motor vehicle comprising in combination, a chassis, a tiltable body mounted thereon, a loading opening in said body, a cover for said opening, a bucket mounted on said body so as to have an upward and downward movement along one and the same path from a position near the ground where it is loaded to a position at said opening where it dumps its load into the body through said opening, the bucket during dumping being tilted about a horizontal axis, and means to raise and lower said bucket, said means comprising an endless flexible member travelling consistently in one direction mounted on spaced pulleys on said body, the pulleys being spaced apart by the distance said bucket has to travel to give the flexible member the required travel to raise said bucket and tilt it, permit it to pause for a time in tilted position and then permit it to begin return movement without opportunity of overtravel which might cause injury by contact of the bucket and the cover, and means operatively connecting said bucket to said endless flexible member.

7. Apparatus as set forth in claim 6 in which said endless flexible member is mounted on the side of said body in approximate alignment with the longitudinal axis of the body.

8. A self-loading vehicle comprising in combination, a chassis, a dump body tiltably mounted thereon, a loading opening in the top of the body, a hood on the top of the body above said opening, the hood having a lateral opening thereinto, a track extending up the side of said body and curved over at the top toward said hood and opening, a bucket mounted to travel up and down said track, cables attached to each end of said bucket, guide means beyond the ends of said hood for directing the cables over the top of said body, guide means on the side of the body opposite the tracks for directing the cables longitudinally of the body, and means for moving the ends of the cable distant from the bucket longitudinally of the body for raising and lowering the body.

9. In a self-loading vehicle, in combination, a chassis, a tiltable body mounted thereon, a power shaft mounted at least in part on the chassis, a power shaft mounted at least in part on the body and a driving connection between said shafts maintaining constant assembly relationship therebetween in all positions of the body, said connection establishing a driving relationship between the shafts when the body is in its lower position but breaking the driving relationship when the body is raised.

10. In a vehicle in combination, a chassis, a part arranged to be elevated with respect to said chassis and power driven means for elevating and lowering said member, said means comprising an endless flexible member passing over spaced pulleys, a connecting device between the part to be elevated and a point on said endless member, said endless member being operable for raising and lowering said part reversely along the same path while moving in one direction, a power clutch for said power driven means, and connections between said clutch and said endless member for operating the clutch to stop the part being elevated in a predetermined position.

11. In a vehicle in combination, a power drive mechanism including a clutch and an endless driving member passing over spaced pulleys, a part adapted to be given a reciprocatory movement between two spaced points by movement of said endless member in one direction, and connections between said clutch and said endless member for operating the clutch to stop the movement of the endless member in a predetermined position.

12. In a vehicle in combination, a chassis, a part arranged to be elevated with respect to said chassis, and means for elevating said part comprising two endless flexible members having spans moving in opposite directions and capable without reversal of movement of elevating and lowering said part and separate means connected to said part and to the oppositely moving spans of said members for moving said part.

13. In a vehicle in combination, a chassis, a part arranged to be elevated with respect to said chassis, and means for elevating said part comprising two endless flexible members operating upon spaced pulleys of parallel shafts, said members having spans moving in opposite directions and capable without reversal of movement of elevating and lowering said part, separate means connected to said part and to the oppositely moving spans of said members for moving said part, and means for driving said pulleys from a single power shaft disposed between them.

14. In a vehicle in combination, a chassis, a part arranged to be elevated with respect to said chassis, and means for elevating said part comprising two endless flexible members operating upon spaced pulleys of parallel shafts, said members having spans moving in opposite directions and capable without reversal of movement of elevating and lowering said part, separate means connected to said part and to the oppositely moving spans of said members for moving said part, and means for driving said pulleys from a single power shaft, said driving means comprising worm gears for adjacent pulleys of each flexible member and a worm pinion meshing with both of said gears.

15. In a self-loading vehicle in combination, a chassis, a body, a loading device arranged to be elevated with respect to said body, a pair of cables connected to said device, support and guide members on said body over which said cables pass, endless chains passing over spaced sprockets, means for connecting one of said cables to each of said chains at a point therein which has an opposite phase from the other whereby the chain-connected ends of said cables travel in opposite direction, and means for driving said chains, consistent non-reverse movement of said chains in the same direction causing both elevation and descent of said loading device.

16. In a self-loading vehicle in combination, a chassis, a body thereon, an inclined track having a section hinged at its upper end upon said body, a carriage movable up said track, said track section swinging up with said carriage to empty material into said body, and means for elevating said carriage, said means including an endless driven chain capable by sustained movement in one direction of elevating the carriage, tilting the carriage and track section to empty the carriage, lowering the track section and carriage, and lowering the carriage down the track.

17. In a self-loading vehicle in combination, a chassis, a body titltably mounted on said chassis, means mounted on said body for elevating and lowering a part along a single path with respect thereto while moving in one direction, a clutch for connecting said means to a power drive device, means associated with said clutch and said elevating means for actuating the clutch by the means, and means for rendering said clutch actuating means effective or ineffective at will.

18. In a self-loading vehicle in combination, a chassis, a body tiltably mounted on said chassis, means mounted on said body for elevating and lowering a part reversely along the same path with respect thereto while moving in one direction, a clutch on said body, and means associated with said clutch and said elevating means for actuating the clutch by said elevating means, said means comprising an arm disposed adjacent the elevating means and a sliding rod on which said arm is secured, sliding of said rod serving to move said arm in position to be operated or to move it out of such position.

19. In a self-loading vehicle in combination, a chassis, a body tiltably mounted on said chassis, means mounted on said body for elevating and lowering a part reversely along the same path with respect thereto while moving in one direction, a clutch on said chassis, means associated with said clutch and said elevating means for actuating the clutch by said elevating means, and manual devices adapted to control said clutch irrespective of said elevating means.

20. In a self-loading vehicle in combination, a chassis, a body tiltably mounted on said chassis, means mounted on said body for elevating and lowering a part reversely along the same path with respect thereto while moving in one direction, a clutch on said chassis, means associated with said clutch and said elevating means for actuating the clutch by said elevating means, and manual devices adapted selectively to control said clutch irrespective of said elevating means or to condition the clutch for operation by said elevating means.

21. In a self-loading vehicle in combination, a chassis, a body tiltably mounted thereon, a track mounted on said body, a carriage movable upon said track, a power element on said chassis for elevating said carriage, means connected to said power element providing controlled movement of said carriage in various positions of the body, said means including mechanism holding said carriage against movement except by operation of the power element, and means for limiting the power transmitted to the carriage whereby breakage is prevented in case the carriage meets undue opposition to its movement.

22. In a self-loading vehicle in combination, a chassis, a body tiltably mounted thereon, an inclined track fixedly mounted on said body, a carriage movable upon said track from a lower position where it may be filled by emptying containers therein to an upper position where it dumps into the body, a cooperating track section at the upper end of said fixed track adapted to be engaged by said carriage, said section being pivoted at its upper end, a draft member passing above the upper end of said pivoted section for elevating the carriage and thereafter tilting the carriage together with the pivoted section, a swinging closure member, and a replaceable wear member on said carriage cooperating with said closure member when the carriage is swung upwardly with said pivoted section for operating the closure member, the wear member being located on the outer edge of the carriage where it will also receive the wear occasioned by emptying containers into the carriage.

23. Power take-off mechanism for the operation of devices on the tiltable dump body of a vehicle, comprising a drive shaft mounted at least in part on the vehicle chassis, a driven shaft mounted at least in part on the tiltable vehicle body said shafts being substantially parallel when the body is in its lowered position, and a flexible driving connection between said shafts, including a universal joint coupling located near the pivot line of the body upon the chassis.

24. In a self-loading vehicle in combination, a chassis, a body tiltably mounted on said chassis, an endless flexible member mounted on said body for reciprocating a part with respect to the body while the flexible member moves invariably in one direction, a clutch on said chassis controlling the operation of said flexible member, and a clutch operating rod extending across the body, said rod having an arm extending into the path of a part on the flexible member whereby the clutch is operated, and said rod being movable axially to move said arm out of the path of said flexible member.

25. In a self-loading vehicle in combination, a chassis, a cargo body mounted thereon, a loading opening in said body, means for conveying a load of material from a point near the ground to said opening and depositing it therein, means for constraining the material-conveying means to travel up and down along the same path, and means for operating said material-conveying means, including an orbit travelling element operable while moving solely in one direction and without reversal for raising and lowering said material-conveying means, and power take-off mechanism for driving said orbit-travelling element from power means on the vehicle.

26. Apparatus as set forth in claim 25 in which the loading mechanism including said material-conveying and said travel-constraining means are mounted on the body and said power means is mounted on the chassis, and a drive connection for operating the loading mechanism on the body from the power means on the chassis.

27. Apparatus as set forth in claim 25 in which said power take-off mechanism includes means holding said orbit-travelling element against back-drive action whereby said material-conveying means is held in any position in which it may be stopped even though the drive connection to the primary source of power is disconnected.

28. Apparatus as set forth in claim 25 in which two orbit-travelling elements are provided, and means for operatively connecting said material-conveying means to each of said elements.

29. In a self-loading vehicle in combination, a chassis, a cargo body tiltably mounted thereon, a loading opening in said body, a track mounted on said body extending from a point near the ground to said loading opening in the body, a loading carriage reciprocable along a single path up and down said track to convey material upward and dump it into said opening, and means for operating said carriage, including an endless flexible element operable while travelling solely in one direction and without reversal for raising and lowering said carriage, and power take-off mechanism for driving said endless element from power means on the vehicle chassis.

In testimony whereof I have signed my name to this specification this 3rd day of April, 1928.

WILLIAM S. HOWARD.